United States Patent

Yoshino

[11] Patent Number: 5,416,869
[45] Date of Patent: May 16, 1995

[54] SEMICONDUCTOR LASER/OPTICAL FIBER COUPLING DEVICE

[75] Inventor: Takashi Yoshino, Tokyo, Japan

[73] Assignee: NEC Corporation, Tokyo, Japan

[21] Appl. No.: 34,467

[22] Filed: Mar. 19, 1993

[30] Foreign Application Priority Data

Mar. 19, 1992 [JP] Japan .................................. 4-062909

[51] Int. Cl.6 ................................................. G02B 6/42
[52] U.S. Cl. ........................................ 385/88; 385/11;
385/34; 385/49; 385/92; 385/93
[58] Field of Search ....................... 385/11, 14, 33, 34,
385/88, 92, 93, 49; 356/369, 364, 365, 351, 327,
73.1; 372/43, 50, 36

[56] References Cited

U.S. PATENT DOCUMENTS

| | | | |
|---|---|---|---|
| 4,212,537 | 7/1980 | Golob et al. | 356/73.1 |
| 4,673,244 | 6/1987 | Miles | 385/38 |
| 4,740,049 | 4/1988 | Yamazaki | 356/73.1 X |
| 4,852,962 | 8/1989 | Nicia | 385/11 X |
| 4,899,045 | 2/1990 | Kramer | 356/73.1 X |
| 5,074,682 | 12/1991 | Uno et al. | 385/93 |
| 5,121,451 | 6/1992 | Grard et al. | 385/49 X |
| 5,127,072 | 6/1992 | Blauvelt et al. | 385/88 |
| 5,216,737 | 6/1993 | Driessen et al. | 385/93 |
| 5,247,530 | 9/1993 | Shigeno et al. | 372/36 |

Primary Examiner—Brian Healy
Attorney, Agent, or Firm—Sughrue, Mion, Zinn, Macpeak & Seas

[57] ABSTRACT

In a semiconductor laser device used as an optical time domain reflectometer, a polarizer is inserted in the path of the laser light. The plane of polarization of the polarizer is aligned to the plane of polarization of the emitted laser light, and the polarizer transmits the emitted laser light without attenuation. A reflected laser light from an optical fiber under test is a non-polarized light and receives a substantial attenuation by the polarizer. Thus, problems associated with reradiation echoes are prevented.

3 Claims, 4 Drawing Sheets

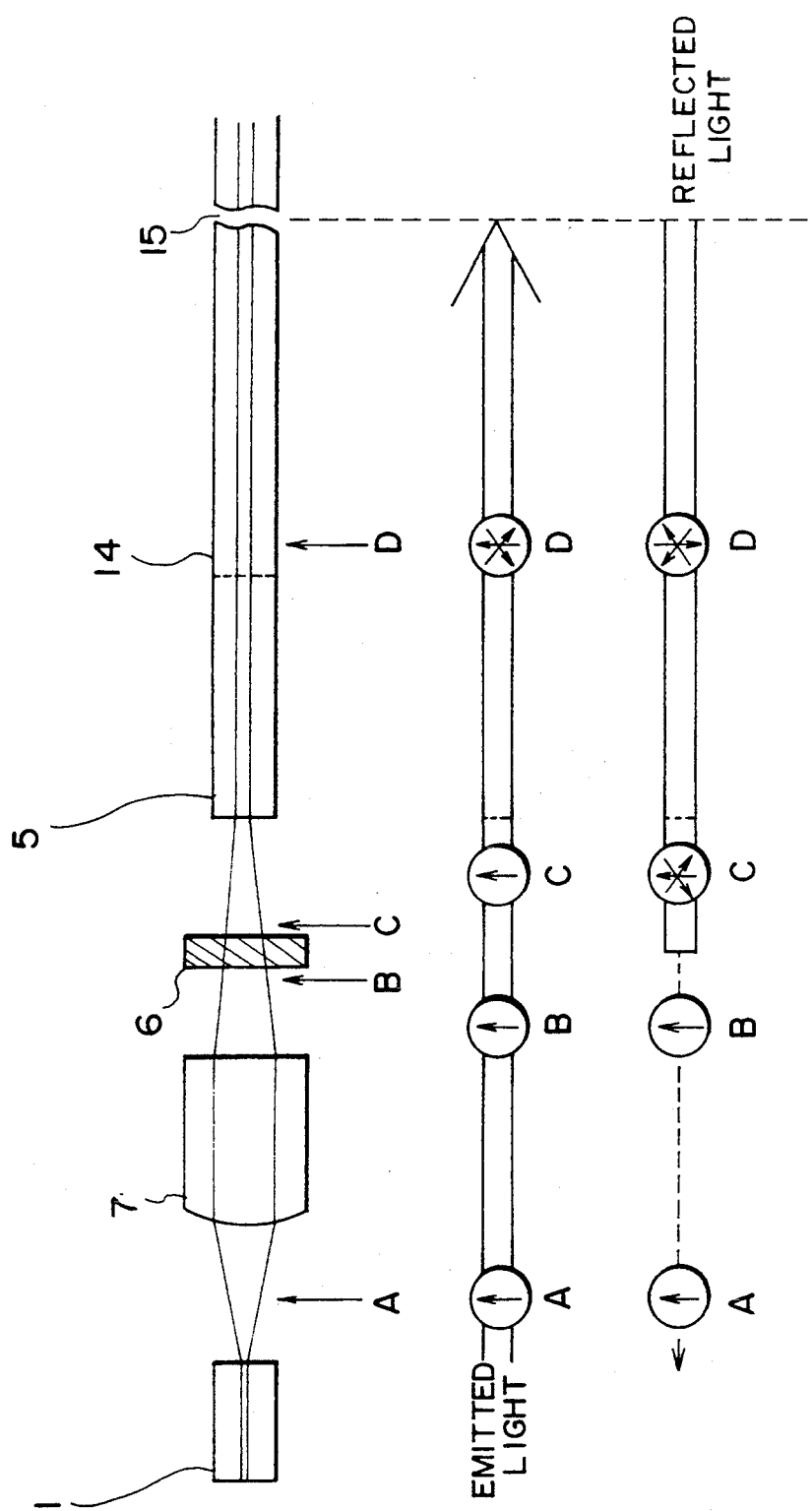

SEMICONDUCTOR LASER/OPTICAL FIBER COUPLING DEVICE

BACKGROUND OF THE INVENTION

This invention relates to a semiconductor laser device, and more particularly to a device used in an optical time domain reflectometer.

An optical time domain reflectometer is used, for example, to test an optical fiber network. A semiconductor laser emits a pulse modulated laser light into an optical fiber under test. The emitted laser light travels in the optical fiber and is reflected from surfaces of discontinuity. If there is a broken point in the fiber, a strong reflection is obtained from the broken point. The reflected light is detected by the semiconductor laser, and by measuring the time difference between the time of emission and the time of detection, the position of the broken point is determined.

Furthermore, there has been a problem of multiple reflections in a heretofore known reflectometer. An echo (reflected light) returns to the reflectometer and enters the radiating surface of the semiconductor laser. A large amount of the energy of the echo entering the surface is absorbed in the semiconductor laser, but a portion (for example about 10%) is reradiated from the surface. If this reradiated energy is above a certain level, echoes of the reradiated light are detected as multiple reflections.

When an optical fiber under test has branch lines, discrimination of multiple reflections from primary reflections becomes difficult, and multiple reflections give false information about broken points. Thus, reflected light returning to the reflectometer must be sufficiently attenuated before going out from the reflectometer as reradiated light. For example, a total attenuation of over 25 dB (including the 10 dB attenuation at the reradiation) is necessary in order to avoid problems from multiple reflections.

A light attenuator on the path of light in the reflectometer attenuates the reflected light, but it also attenuates the emitted light. An attenuation of the emitted light causes a corresponding attenuation of the reflected light and deteriorates the signal to noise ratio at the detection of the reflected light. Therefore, only the reflected light must be selectively attenuated leaving the emitted light intact.

This kind of selective attenuation can be achieved by a light isolator where a polarizer is placed at an input of a Faraday cell which rotates the plane of polarization and a polarization detector at an output of the Faraday cell. However, this type of light isolator has a complex structure and is bulky for use in a compact semiconductor laser device. Moreover, the isolator itself is expensive.

SUMMARY OF THE INVENTION

Therefore, an object of the present invention is to provide a semiconductor laser device for use in an optical time domain reflectometer where only reflected light is selectively attenuated through a simple optical device.

In order to achieve this object, a fundamental property of a laser light is utilized. A laser light is a polarized light, and this polarization is deteriorated through transmission in an optical fiber. Therefore, a reflected light returns to the laser as a non-polarized light. An optical device which is transparent to a polarized light and attenuates a non-polarized light is inserted in the light path in the reflectometer.

According to an embodiment of this invention, a polarizer is inserted in the light path, and according to another embodiment of this invention, a preserved polarity type optical fiber is used as a coupling optical fiber of the laser device.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

FIGS. 3(a)–(c) illustrate mechanism of light transmission in the device shown by FIG. 1.

DETAILED DESCRIPTION OF THE PREFERRED EMBODIMENTS

Figure 1:
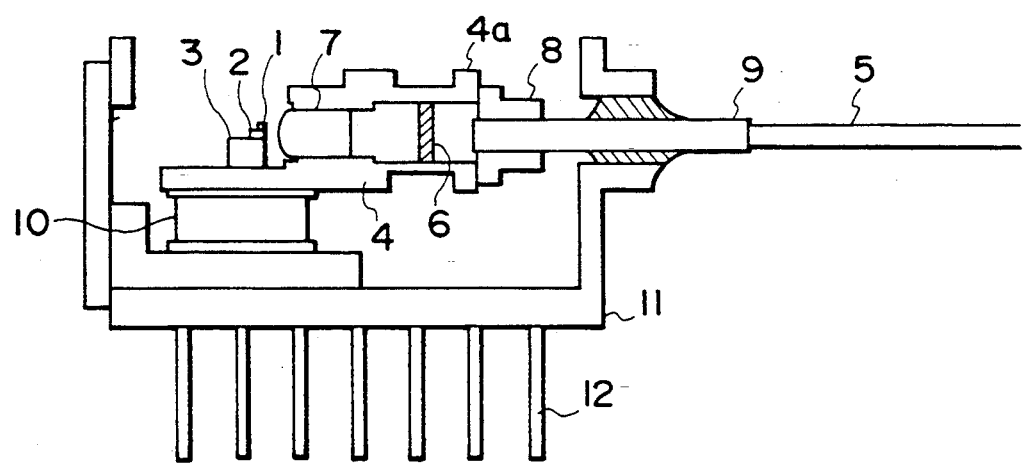
FIG. 1 shows a crosssectional view of an embodiment of this invention.

Referring to FIG. 1, a semiconductor laser 1 attached by a heat sink 2 is mounted on a base 4 across a chip carrier 3. The base 4 serves as a holder of a lens 7. At the other end of the lens holder 4a, a coupling optical fiber 5 protected by a ferrule 9 is secured through a slide ring 8. The coupling optical fiber 5 is commonly called a pigtail. The base 4 is held in a case 11. A Peltier element 10 is inserted between the base 4 and the case 11.

Heat generated by the semiconductor laser 1 is conducted to the base 4 through the heat sink 2 and the chip carrier 3. This heat in the base 4 is conveyed from the back surface of the base 4 to the face surface of the case 11 by the Peltier element 10. The heat is radiated from the case 11. A polarizer 6 is inserted in the light path from the lens 7 to the coupling optical fiber 5.

Electrical circuits for exciting a pulse laser emission, for receiving reflected lights, and for duplexing the semiconductor laser as a light emitting element and as a light receiving element, are not shown in the drawings, these electrical circuits are connected to terminals 12.

Now referring to FIGS. 3, pulse modulated laser light is emitted by the semiconductor laser 1 and the emitted light is converged by the lens 7 and passes the polarizer 6. Since the plane of polarization of the polarizer 6 is aligned to the polarization plane of the emitted laser light, the emitted light passes the polarizer 6 without attenuation. When the polarized light is transmitted through an optical fiber under test 14, the plane of polarization is not preserved but fluctuates in random planes. This is shown by arrows at points A,B,C,D in the emitted light in FIG. 3(b).

A reflected light as shown in FIG. 3(c), is a non-polarized light. A non-polarized light is subjected to a substantial attenuation through the polarizer 6, since only a component having a same plane of polarization with that of the polarizer 6 passes through the polarizer 6. This is shown from C to D of the reflected light in FIG. 3(c). Although the reflected light is attenuated, this attenuation does not deteriorate the signal to noise ratio at the detection of the reflected light, because the noise on the reflected light is equally attenuated.

This attenuation at the polarizer 6, together with the reradiation attenuation offers a total attenuation of over 30 dB to the reradiated energy, and the attenuation is sufficient to suppress troubles associated with multiple reflections.

Figure 2:
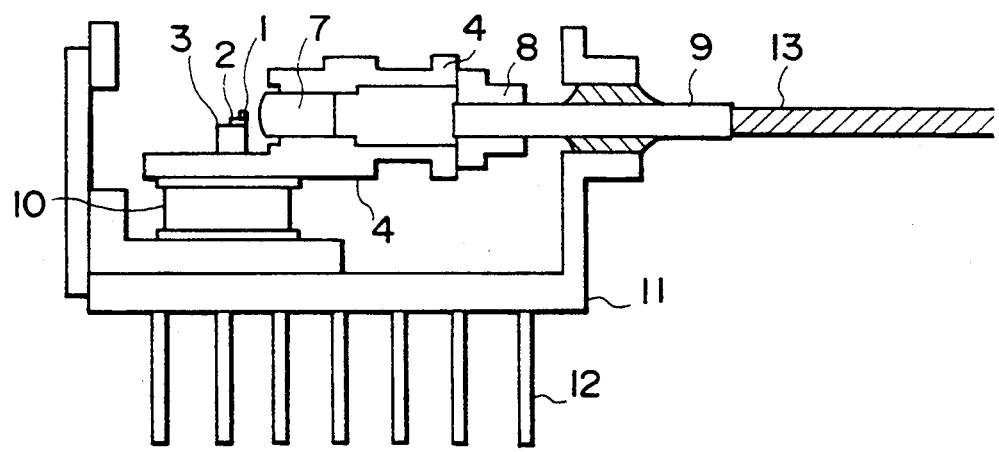
FIG. 2 shows a crosssectional view of another embodiment of this invention.

FIG. 2 shows another embodiment of this invention, and a preserved polarization type optical fiber is used as a pigtail 13. Referring to FIGS. 4, a laser light emitted by the semiconductor laser 1 and converged by the lens 7 enters in a pigtail 13 composed of a preserved polarization type optical fiber which is coupled to an optical fiber under test 14. The plane of the preserved polarization of the pigtail 13 is aligned to the plane of polarization of the emitted light. Optical constructions for coupling the pigtail 13 to the fiber 14 are not shown in the drawing.

Figures 4A, 4B, 4C:
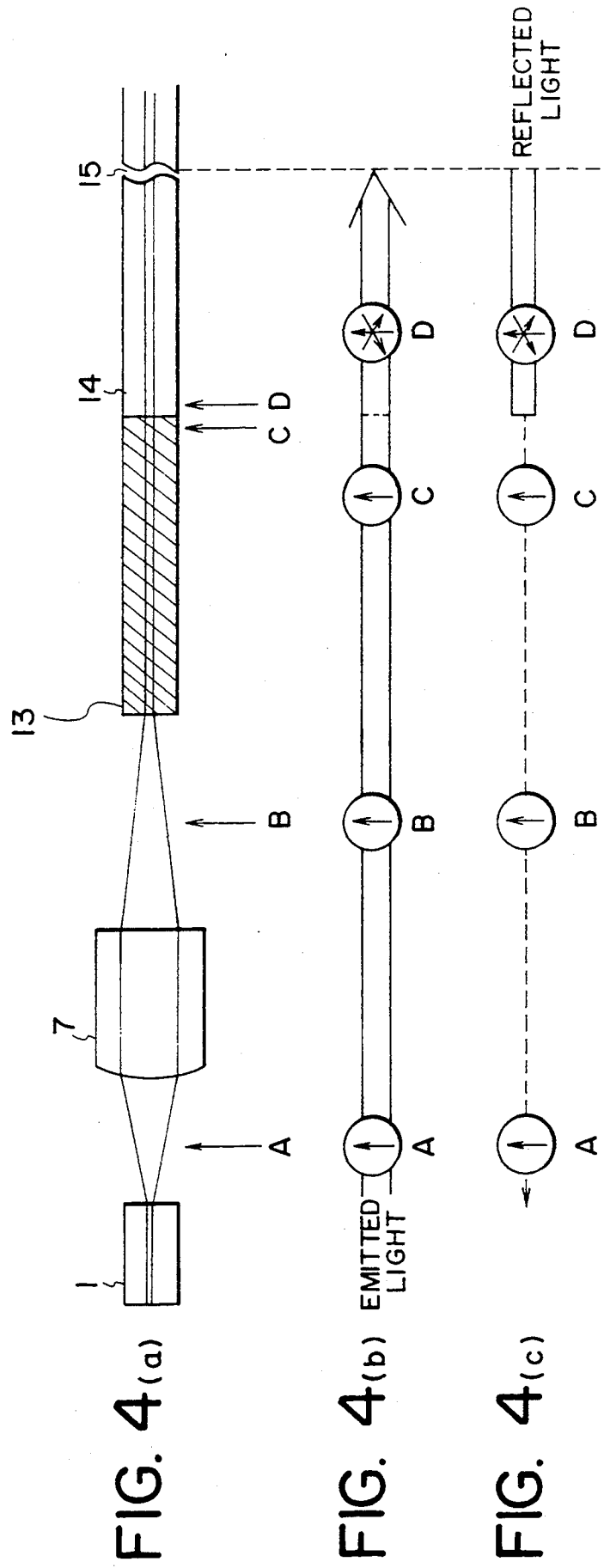
FIGS. 4(a)–(c) illustrate mechanism of light transmission in the device shown by FIG. 2.

As shown in FIG. 4(b), the plane of polarization of the emitted light is preserved in the pigtail 13 made of a preserved polarization type optical fiber, and the emitted light receives no attenuation in the pigtail 13. When the emitted light enters the optical fiber under test 14, the plane of polarization fluctuates in random planes, and the reflected light is a non-polarized light as shown by D in FIG. 3(c). This non-polarized reflected light is attenuated in the pigtail 13. Thus, the reradiated light from the semiconductor laser receives an attenuation of more than 30 dB.

In an embodiment shown in FIG. 1, the plane of polarization of the polarizer 6 must be aligned to the plane of polarization of the emitted laser light, and the beam center of the light at the output of the polarizer 6 must be aligned to the beam center of the light at the input of the pigtail 5. Whereas in the embodiment shown in FIG. 2, required arrangements are to converge the emitted light by lens 7 at the beam center of the pigtail 13, and assembling process is simplified in the embodiment shown in FIG. 2.

I claim:

1. A semiconductor laser device comprising:
   a semiconductor laser for emitting laser light, disposed on a heat sink mounted on a base via a chip carrier, wherein the base is disposed in a case via a peltier element,
   a polarizer,
   a lens, held by the base in light path between the semiconductor laser and the polarizer,
   a coupling optical fiber secured by a ferrule and slide ring, for transmitting said laser light to another optical fiber,
   wherein the polarizer is placed in light path between said lens and said coupling optical fiber, plane of polarization of said polarizer being aligned to that of said emitted laser light, such that the plane of polarization of said laser light entering an input end surface of said coupling optical fiber is aligned with the plane of polarization of said emitted laser light, and
   wherein the laser light is directly coupled from the polarizer to the coupling optical fiber.

2. A semiconductor laser device of claim 1, wherein a lens is placed in light path between said semiconductor laser and said coupling optical fiber for converging said laser light at an input end surface of said coupling optical fiber.

3. A semiconductor laser device comprising:
   a semiconductor laser for emitting laser light, and a coupling optical fiber of a preserved polarization type, receiving said laser light at an input end and delivering received laser light to an optical fiber under test, a plane of preserved polarization of said coupling optical fiber being aligned to a plane of polarization of said laser light, wherein light reflected in the Optical fiber under test and reradiated from the semiconductor laser is attenuated by at least 30 dB.

* * * * *